United States Patent Office 3,496,254
Patented Feb. 17, 1970

3,496,254
METHOD OF MANUFACTURING SOFT AND FLEXIBLE CONTACT LENSES
Otto Wichterle, Prague, Czechoslovakia, assignor to Ceskoslovenská akademie věd, Prague, Czechoslovakia
No Drawing. Filed July 1, 1965, Ser. No. 468,908
Claims priority, application Czechoslovakia, July 2, 1964, 3,817/64
The portion of the term of the patent subsequent to Jan. 2, 1985, has been disclaimed
Int. Cl. B29d 11/00; B29c 5/04, 17/12
U.S. Cl. 264—1   7 Claims

ABSTRACT OF THE DISCLOSURE

A flexible contact lens is prepared by polymerizing a mixture of ethyleneglycol monomethacrylate with a small amount of the corresponding dimethacrylate in a rotating mold. The mixture solidifies into a hard xerogel in the absence of solvents capable of swelling the polymer. Its edges are then cut or ground to the desired shape, whereupon the xerogel is swelled to its ultimate dimensions by insertion in physiological saline solution. The edges of the finished lens are extremely regular and free from defects.

---

This invention relates to contact lenses for correcting refraction errors of the eye, and particularly to soft and flexible contact lenses.

As disclosed in my earlier application Ser. No. 318,627, filed Oct. 4, 1963, and now abandoned, flexible contact lenses may be prepared by polymerizing a suitable aqueous monomer mixture in a rotating concave mold. The polymer produced is sparingly cross-linked so as to be insoluble in aqueous liquids, yet has a large number of hydrophilic functional groups to retain water in a hydrogel structure which has the desired mechanical properties.

The two optical surfaces of the lens are formed simultaneously during polymerization. The outer lens surface is shaped by contact with the smooth mold surface, and the inner lens surface is shaped by the joint action of centrifugal forces and of surface tension in the polymerization mixture. Since the mold diameter is normally between 6 and 14 milimeters, the influence of surface tension on the ultimate lens shape is quite substantial.

The edge of a contact lens formed by polymerization in a rotating mold may not be entirely regular. Small recesses may occur because of microscopic inhomogeneity in the portion of the mixture exposed to ambient atmosphere in a very thin layer near the edge, and minute differences in wetting properties of the mold surface may cause flash or feather edge formation beyond the line of the intended edge. While such small irregularities neither cause irritation of the wearer's eye nor affect the optical quality of the lens, they are objectionable because they may give an impression of poor workmanship in an object in which precision is generally of the utmost importance.

It is not possible or not practical to remedy minor defects of the type described in a soft, flexible contact lens by mechanical working. It has also been found very difficult to dry the hydrogel lenses of my earlier inventions until they are hard enough to permit working with tools. The drying process inherently causes shrinkage, and it is very difficult to control the shrinkage in such a manner that the relationship of all significant dimensions is maintained.

Lenses may be cut and polished in a conventional manner from xerogel blanks which are sparingly cross-linked polymers capable of absorbing water, but not originally containing water or an equivalent swelling agent. A lens blank of the xerogel material is mechanically worked until it constitutes a replica of the desired lens on a reduced scale, and is then immersed in a swelling agent, such as physiological saline solution until it assumes the desired dimensions. The lenses so produced can readily be prepared free from edge defects, but the individual cutting and polishing operations are as costly as those performed on more conventional hard lens materials, and are justified only for special lenses not capable of manufacture by polymerization in a rotating mold.

The primary object of the instant invention is a method of preparing contact lenses which are as free from edge defects as those cut and polished from xerogel blanks, yet are not much more costly to prepare than those obtained by polymerization in a rotating mold.

I have found that the inherent advantages of both mutually exclusive methods are available if a mixture of suitable monomers substantially free from solvents or swelling agents is polymerized in a rotating mold to form a hard blank which differs from the intended lens by predictable dimensional factors due to the absence of the liquid constituent of the hydrogel ultimately formed. If the blank has edge defects of the type discussed, they are readily corrected by grinding the edge or otherwise selectively removing material from the annular edge portion. The corrected lens blank may then be soaked in solvent to remove residual monomer, components or decomposition products of the polymerization catalyst, and like impurities, and is then stored in a solution isotonic with human tissues, such as an aqueous solution of 0.8 percent sodium chloride or a 1.0% sodium bicarbonate solution, as is well known in itself. A small amount of disinfectant may be dissolved in the storage solution in which the lens assumes its ultimate shape and dimensions.

It will be appreciated that the dimensions of the mold employed for polymerizing the solvent-free monomer mixture must be smaller than those of the lens ultimately to be produced by a factor which is readily determined by experiment for any specific polymerization mixture and the chosen operating conditions. The factor by which mold dimensions have to be reduced relative to desired ultimate lens dimensions remains constant if no more than ordinary care is taken in successive runs.

The volume of polymerization mixture employed in the method of the instant invention is significantly smaller than in my earlier methods in which sufficient solvent or swelling agent was initially present to produce a gel structure immediately in the mold. For contact lenses having a diameter of 6 to 14 millimeters, the amount of solvent-free monomer mixture is actually so small that gas bubbles do not occur even if the polymerization rate is sharply increased over that recommended in the earlier method by maintaining the temperature of the mixture at 50° C. or higher.

The hard lens blanks formed in the instant method have optically curved inner and outer faces. These faces may be subjected to secondary shaping operations by means of tools, if so desired, in order to compensate for special conditions of the wearer's eye, but this is not usually necessary. The edges are cut and polished. This is of advantage not only in removing minor defects as mentioned above, but also permits a thin edge to be formed on relatively thick-edged blanks such as those produced in molds having an annular sharp edge or groove for limiting the overall dimensions of the polymerizate, and particularly those having high negative refraction values. A thin edge which is very flexible is essential for smooth movement of the eyelid over the contact lens without irritation.

The lens perimeter may also be cut to a shape which lacks axial symmetry and may even be irregular. Such shapes are employed in conventional contact lenses of relatively large diameter to cause automatic angular orientation of the lens relative to the optical axis of the eye. Asymmetry obtained by cutting the edge portions has the same effect in the contact lenses of the invention, and is beneficial in the correction of anastigmatism. The lens is preferably cut in such a manner that a portion of the otherwise circular lens projects toward a corner of the eye.

The solvent employed for removing residual or decomposed catalyst which is not soluble in water should be readily soluble in or miscible with water so that the solvent is removed by storing the lens in an aqueous solution. Water-soluble catalyst and water-soluble decomposition products, of course, may be removed by diffusion into an aqueous storage solution, and the solvent soaking step may be omitted.

Ethanol, if suitable for the catalyst employed, is preferred as the soaking solvent. It has some swelling effect on hydrophilicpolymers employed in this invention, and is readily replaced by water in the gel structure formed by swelling.

The aqueous swelling solution in which the ultimate lens shape is attained must be approximately isotonic with living human tissue, and must be free of toxic material. Its composition is not otherwise critical. It may contain a buffer to maintain a desired pH value, and the use of disinfectants has been mentioned above. Boric acid in very small amounts has been found useful for maintaining pH and because of its mild disinfectant effect.

The polymerizates of the invention which are substantially free from swelling agent normally adhere firmly to the mold in which they were produced. If the mold is provided with an axial stem, the lens blank is conveniently handled during mechanical working with the mold. The stem may be inserted in the chuck of a lathe, and the blank may be shaped by cutting with conventional cutting tools. Polishing pastes, conventional in themselves, are preferably employed for polishing of the edge or rim portion which also may be performed on the lathe.

If the mixture would be too brittle for working without plasticizer, a very small amount of a water soluble liquid such as ethylene glycol or glycerol may be added to the polymerization mixture. Even water in minute, precisely controlled amounts may be employed as a plasticizer which is added to the original mixture of monomers. The use of a small amount of plasticizer is generally advisable if edge portions of the lens blank are to be cut away by means of sharp tools.

The cut and polished lens blank separates readily from the mold when contacted with a swelling agent, such as ethanol or water.

The polymerization catalyst system is chosen to suit the specific monomers employed. The catalyst or catalysts must be soluble in the monomers in the substantial absence of solvent, particularly water. If relatively high operating temperatures can conveniently be maintained over extended polymerization periods, dibenzol peroxide or azo-bis-isobutyronitrile may be employed as catalysts. If higher polimerization rates are to be achieved at relatively low temperature, redox catalyst systems are preferred. The oxidizing component of the system may be dibenzoyl peroxide, di-isopropyl percarbonate, methylethylketone peracetal, maleic hydroperoxide, or the like, and may be combined with known reducing agents such as p-toluene sulfinic acid and its derivatives. Trace amounts of heavy metals in soluble form are beneficial. Cuprous benzoate and its pyridinium complex, and cobalt naphthenate are typical of heavy metal accelerators well known in themselves, but other salts of copper, iron or cobalt may be employed in the usual manner. Isopropyl percarbonate alone has been found particularly useful at polymerization temperatures somewhat above room temperature.

The practically water-free mixtures of monomers and catalysts used in the method of the invention must be prepared at temperatures low enough to minimize polymerization outside the mold. Polymerization is initiated in the mold by heating the mixture to a suitable temperature, which may be between 30° and 60°, depending on composition.

Polymerization may also be initiated or accelerated by ultraviolet light or by ionizing radiation, by chemical initiators, or by sensibilizing agents which make the mixture responsive to light in the visible range of the spectrum.

It is not necessary to rotate the polymerization mixture with the mold until polymerization is completed. The mixture gels and becomes adequately shape retaining before it is fully cured and hard enough to permit mechanical working. Curing may be completed in the stationary mold.

The following examples are further illustrative of the method of this invention, but it should be understood that the invention is not limited to the specific embodiments chosen for the purpose of illustration.

Example 1

A polymerization mixture was prepared from 15 parts methacrylamide, 80 parts ethylene glycol monomethacrylate containing 0.4% ethyleneglycol bis-methacrylate, and 5 parts dibenzoyl peroxide. 50 milligrams of the mixture were dropped into a spherically concave mold having a diameter of 5 mm. The mold was rotated at 400 r.p.m. in an inert atmosphere of oxygen-free helium at a temperature of 80° C.

The copolymerization was completed in six hours, but gelation took place much earlier, and it was not necessary to rotate the mold during the entire polymerization period. The lens adhered firmly to the mold which had an axial stem. The stem was placed in the chuck of a lathe, and the edge of the lens was ground with an oil suspension of powdered alumina.

After machining, the lens and mold were washed and finally immersed in hot 85% ethanol whereupon the mold separated from the lens. The lens then washed with distilled water, and ultimately stored in 0.8% aqueous chloride solution until osmotic equilibrium was reached.

Example 2

A mixture of approximately 97% (by weight) ethyleneglycol monomethacrylate, 0.25% ethyleneglycol bis-methacrylate, 0.25% diethyleneglycol bismethacrylate, and 2.0% ethyleneglycol was cooled to $-10°$ C. At that temperature, 0.2% diisopropyl percarbonate were admixed as the catalyst.

60 milligrams of the catalyzed mixture were metered into a glass mold having the shape of a hemisphere of 7.5 mm. diameter with a slightly flattened bottom. The mold was rotated 80 minutes at 420 r.p.m. in a carbon dioxide atmosphere free from oxygen while the mold temperature was kept at 60° C. whereupon copolymerization was complete.

The lens, while still attached to the mold, was secured in a lathe, as described in Example 1, and its rim or edge was ground until perfectly smooth and flat. After preliminary cleaning with 50% ethanol, the lens and mold were immersed in the same solvent whose temperature was kept at 70° C. The lens swelled somewhat and separated from the mold.

The lens was removed from the alcohol bath after 15 minutes, was washed further in running deionized water at 70°–80°, and was ultimately stored in physiological saline solution. When equilibrium was reached, the linear dimensions of the lens had increased 17 percent over the corresponding dimensions of the hard polymerizate originally produced.

Those skilled in the art will readily substitute other suitable materials in the procedures of the preceding examples. The copolymers of major amounts of monoesters of acrylic and methacrylic acid with polyhydric alcohols and of minor amounts, preferably less than one percent, of diesters of the same acids with the same alcohols may be replaced by other physiologically tolerated, transparent polymers capable of forming hydrogels because of numerous repeating hydrophilic radicals or atom configurations. The polymerization mixture may contain acrylamide, the acrylates and methacrylates of glycerol, and the acrylates and methacrylates of polyhydric alcohols having more than three hydroxyl radicals. Polyhydroxyethers may replace the polyhydric alcohols as exemplified by diethyleneglycol in Example 2. Other monomers suitable for the copolymerization mixture of the invention include glycol diesters of polymerizable olefinic dicarboxylic acids such as itaconic and maleic acid; monoallyl esters of a wide variety of hydroxycarboxylic acids such as hydroxypropionic acid, tartaric acid, and malic acid; monoallyl and vinyl ethers of compounds having two or more hydroxy radicals such as glucose, mannitol, sorbitol, and pentaerythritol. Diesters and diethers, triesters and triethers of the same polyvalent acids or alcohols may be used as cross-linking agents. Diesters of the afore-mentioned dicarboxylic acids with allyl alcohol are merely exemplary of additional suitable cross-linking agent.

If the polymerization mixture is entirely free from water and of compounds which readily produce ions, the fore-mentioned free-radical catalysts may be replaced by anionic or cationic catalysts suited for the specific monomers employed.

The nature of the oxygen-free inert gas employed as a blanket during polymerization is irrelevant in itself. Nitrogen and argon are typical of gases commercially available that may be employed instead of the inert atmospheres referred to in the examples.

Other modifications may obviously be resorted to by those skilled in the art without departing from the spirit and scope of the invention as only preferred embodiments thereof have been disclosed.

What I claim is:
1. A method of making a contact lens which comprises:
 (a) rotating a polymerization mixture while retained in a mold having a concavely arcuate surface about an axis transverse of said surface until the mixture is shape retaining,
  (1) said mixture initially consisting essentially of a major amount of a compound having a polymerizable olefinic bond and at least one organic hydrophilic radical, a minor amount of a cross linking agent having two polymerizable olefinic double bonds, said minor amount being not substantially more than one percent of said major amount, and a polymerization catalyst;
 (b) retaining said mixture in said mold at least until the mixture becomes shape retaining, said mixture being initially free from solvent that would cause swelling of the shape retaining mixture, whereby said mixture ultimately becomes a hard body having a convex face, a concave face and an edge portion connecting said faces;
 (c) selectively removing at least a part of the edge position of the hard body by mechanical working; and
 (d) immersing the worked body in an aqueous solution isotonic with human tissue until it swells substantially to osmotic equilibrium with said solution.

2. A method as set forth in claim 1, wherein said edge portion of said hard body is removed while said body is retained in said mold.

3. A method as set forth in claim 1, wherein said compound is ethyleneglycol monomethacrylate, said cross linking agent is ethyleneglycol dimethacrylate, and said catalyst is a peroxide derivative of an organic acid.

4. A method as set forth in claim 3, wherein said catalyst is benzoyl peroxide.

5. A method as set forth in claim 3, wherein said catalyst is diisopropyl percarbonate.

6. A method as set forth in claim 3, wherein said mixture initially contains methacrylamide.

7. A method as set forth in claim 3, wherein said mixture is rotated in said mold under a blanket of an inert gas free from oxygen.

References Cited
UNITED STATES PATENTS 3,361,858  1/1968  Wichterle _____ 264—1

FOREIGN PATENTS 990,207  4/1965  Great Britain.
1,342,447  9/1963  France.
108,895  11/1963  Czechoslovakia.

JULIUS FROME, Primary Examiner
A. H. KOECKERT, Assistant Examiner

U.S. Cl. X.R.
260—29.6, 33.4; 264—85, 162, 233, 343; 351—177